(12) United States Patent
Maharaj et al.

(10) Patent No.: US 12,536,183 B1
(45) Date of Patent: Jan. 27, 2026

(54) IDENTIFYING AND MODIFYING COMPONENTS OF A PHYSICAL DOCUMENT USING MACHINE-LEARNING MODELS

(71) Applicant: Maplebear Inc., San Francisco, CA (US)

(72) Inventors: Shaun Navin Maharaj, Vaughan (CA); Bryan Pham, London (CA); Prithvishankar Srinivasan, Seattle, WA (US); Rakshit Shukla, Mississauga (CA); James Matthews, San Francisco, CA (US); Brent Scheibelhut, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/888,134

(22) Filed: Sep. 17, 2024

(51) Int. Cl.
  *G06F 16/2457* (2019.01)
  *G06F 16/93* (2019.01)
  *G06N 20/00* (2019.01)

(52) U.S. Cl.
  CPC ........ *G06F 16/24578* (2019.01); *G06F 16/93* (2019.01); *G06N 20/00* (2019.01)

(58) Field of Classification Search
  CPC .... G06F 16/24578; G06F 16/93; G06N 20/00
  See application file for complete search history.

(56) References Cited

U.S. PATENT DOCUMENTS

| | | | |
|---|---|---|---|
| 11,216,892 B1* | 1/2022 | Harris | G06F 16/45 |
| 2014/0258839 A1* | 9/2014 | Hamilton, II | G06F 40/12 |
| | | | 715/234 |
| 2017/0357660 A1* | 12/2017 | Damgaard Husted | |
| | | | G06Q 30/0277 |
| 2018/0084078 A1* | 3/2018 | Yan | H04L 67/63 |
| 2018/0113944 A1* | 4/2018 | Okhonko | G06F 40/174 |
| 2018/0191847 A1* | 7/2018 | El-Arini | H04L 67/12 |
| 2020/0065357 A1* | 2/2020 | Noursalehi | G06F 40/106 |
| 2021/0342927 A1* | 11/2021 | Morin | G06Q 30/0276 |
| 2021/0374360 A1* | 12/2021 | Paul | G06F 40/56 |

* cited by examiner

*Primary Examiner* — Jensen Hu
(74) *Attorney, Agent, or Firm* — Fenwick & West LLP

(57) ABSTRACT

An online system customizes documents for a particular context, user, or set of users. The online system receives an image of a physical document and extracts components, such as text, titles, items and their metadata, from the physical document. The online system may apply rules to the metadata for one or more items to determine whether to modify at least a portion of the metadata. The online system also applies a model to generate an affinity score for a context or a user and each component of the document. If the score for a component is below a threshold, the online system prompts a generative model to generate replacement content for the component. Subsequently, the online system applies the model to the generated replacement content and updates the document with the generated replacement content for the component if the score of the generated replacement content is higher.

20 Claims, 5 Drawing Sheets

IDENTIFYING AND MODIFYING COMPONENTS OF A PHYSICAL DOCUMENT USING MACHINE-LEARNING MODELS

BACKGROUND

Various sources of items distribute documents to customers that identify items available from a source or items associated with promotional offers by the sources. A document may be a physical document distributed by a source to various customers or may be a digital document that is electronically distributed to customers. However, conventional documents both physical and digital-include static content preselected by the source for distribution to multiple users, with each document including the same group of items.

While preselection of content for a document simplifies creation of the document, preselecting content prevents a document from including content that is customized for individual customers who receive the document. For example, having each copy of a document identify common items omits certain items that a particular user or group of users have an interest in obtaining. As documents identify a limited number of items, an inability to customize items included in a document for a specific customer prevents a source from tailoring content of a document to a specific customer to increase a likelihood of the customer obtaining one or more items identified by the document from the source.

Similarly, certain items that a source includes in a document may be problematic to some users receiving the document, which reduces a likelihood of the customer obtaining one or more items from the source in response to the document. For example, a user who is allergic to specific food items may receive a document identifying one or more of the specific food items that the source preselected for inclusion in the document. This inefficiently uses the limited space in a document by including items that are not relevant to certain users receiving the document, which decreases a number of items from the document that the certain users subsequently obtain.

While an online system may present a physical document from a source to users of the online system or present a digital document from the source to users, the online system presents the static content included in such a document to each user. As users often access the online system using client devices with limited display areas, the static content in a document from a source inefficiently uses a limited display area by presenting various items that are less relevant to different users. Preselection of the group of items for a document often ineffectively presents content in the limited display area of a client device to users of the online system, preventing various users from interacting with the document or interacting with the source in response to the document.

SUMMARY

In accordance with one or more aspects of the disclosure, an online system enables users to select items offered by one or more sources, which the online system subsequently obtains for the users. For example, the online system receives an order including one or more items and identifying a source from which the items are to be obtained. Subsequently, the online system obtains the selected items from the identified source and delivers the obtained items to a location identified by the order. As various online systems maintain information about users, leveraging the information about users as well as content included in a document by a source allows an online system to more efficiently allocate portions of display area of a client device for presenting content from the document and items relevant to a specific user.

To increase a number of items obtained by users or to increase a frequency with which users obtain items, a source may distribute a physical document to users of the online system. The physical document includes a group of items preselected by the source and other content, such as images or text, preselected by the source for distribution to multiple users. The physical document may also identify promotions offered by the source for obtaining items. Conventionally, the source mass distributes the physical document to multiple users, with content included in the physical document common to each user receiving the physical document. For example, the source mails the physical document to addresses of users of the online system. As another example, the source provides the physical document to users of the online system through one or more physical locations of the source that users visit.

For example, the physical document identifies a group of items offered by the source to increase awareness of the group of items to users of the online system. Additionally, the physical document may also identify one or more promotions offered by the source, such as discounted prices for one or more items offered by the source or opportunities to obtain combinations of items from the source. While preselecting content to include in the physical document simplifies creation of the physical document, including common content in each copy of the physical document does not account for user-specific preferences for different items. Various users of the online system may be more likely to obtain certain items from the source that are not included in the group of items in the physical document, so the physical document has limited influence on those users obtaining items from the source. Similarly, users of the online system may have an aversion to specific items offered by the source, and inclusion of one or more of those specific items in the physical document decreases an amount of the physical document available for presenting items more relevant to the users. Additionally, certain attributes of one or more items included in the physical document may differ when a user obtains the item from the source directly or obtains the item from the online system, and the physical document does not reflect the attributes of the items when obtained via the online system.

As the online system maintains characteristics of users, including orders that the online system previously fulfilled for the user and prior interactions by users with content presented by the online system, the online system may leverage the maintained characteristics of users to generate content based on the physical document that is personalized for a particular user. By leveraging items offered from a source identified in the physical document and characteristics of a user, the online system generates content from the physical document that is personalized for distribution to a particular user. To generate personalized content, the online system obtains an image, or other representation, of the physical document and extracts one or more components of the physical document. For example, the online system applies a combination of models to the image of the physical document that extracts different components of the physical document. The online system applies a combination of one or more optical character recognition (OCR) models and one or more visual language models (VLMs) to the image of the physical document to extract components of the physical document based on text and images included in the physical document. Example components of the physical document include: items identified by the physical document, metadata associated with items identified by the physical document (e.g., a price, a name, a description, an image), section titles or descriptions within the physical document, images included in the physical document, descriptions of items included in the physical document, headings included in the physical document, as well as other information included in the physical document.

In some embodiments, the online system applies one or more rules to certain types of components extracted from the physical document to modify content comprising the certain types of components. For example, a component comprises a price of an item offered by the source, which the physical document specifies based on a user obtaining the item directly from the source; however, the item may have a different price when obtained via the online system. In the preceding example, the online system applies a rule to extracted components having a type of metadata specified by the rule that replaces a value of the metadata having the type specified by the rule with alternative content identified by the rule. For example, a rule specifies a type of a component that is a price of an item, and the rule specifies an alternative value (e.g., a price of the item from an item catalog) that replaces the price for an item from the physical document for a component that is a price of an item. Applying one or more such rules allows the online system to modify content comprising one or more components having specific types from content specific to the source to alternative content maintained by online system for components having the specific types.

Each component extracted from the physical document corresponds to a portion of content of the physical document. With different components extracted from the physical document, the online system identifies a user and retrieves characteristics of the user maintained by the online system. Alternatively, the online system identifies a user and extracts components from the physical document. Example characteristics of the user include: a location of the user, one or more prior orders fulfilled by the online system for the user, prior interactions with content previously presented to the user by the online system, demographic information of the user, or other information describing the user or describing interactions previously performed by the user. Additionally, the online system retrieves characteristics of a source associated with the physical document. The online system may identify the source associated with the physical document from content included in the physical document. Alternatively, the online system receives an identifier of the source associated with the physical document in conjunction with the image of the physical document. Example characteristics of the source include: an item catalog associated with the source identifying items offered by the source and attributes of items offered by the source, a location of the source, one or more promotions offered by the source, or other information describing the source or items available via the source.

For each component of the physical document, the online system applies an interaction model to attributes of the component, characteristics of the user, and characteristics of the source associated with the physical document to generate a score that comprises a probability of the user performing a specific interaction with the component of the physical document. In some embodiments, the specific interaction comprises the user including an item associated with the component in an order. For another example, the specific interaction comprises the user selecting the component. The online system trains the interaction model based on prior interactions by one or more users with components of content presented to the one or more users, characteristics of the one or more users, and attributes of sources associated with the content presented to the one or more users through a backpropagation process. In various embodiments, the online system applies the interaction model to multiple training examples, each including attributes of a training component from a training document, attributes of the training document, characteristics of a training user, and characteristics of a source associated with the training document. Based on differences between a label applied to a training example indicating whether a training user performed the specific interaction with the training component of the training example and a predicted score from the interaction model, the online system modifies one or more parameters of the interaction model until one or more criteria are satisfied.

Generating the score for a component of the physical document based in part on characteristics of the user accounts for prior interactions by the user with content presented by the online system, so the score for a component is customized for a combination of a component and a user. The online system leverages a score for a component by determining whether the score for the component equals or exceeds a threshold score, with the threshold score specifying a minimum probability of the user performing the specific interaction with the component. In some embodiments, the online system determines a type of a component and retrieves a threshold score associated with the determined type, allowing the online system to maintain different threshold scores for different types of components. For example, different threshold scores are associated with an item, with an image, and with text. Alternatively, the online system 140 maintains a single threshold score applicable to multiple types of components. In some embodiments, different threshold scores may be associated with different sources.

In response to a score for a component being less than the threshold score, the online system modifies content comprising the component. Different modifications may be performed to content comprising different types of content. In various embodiments, for a component comprising an item, the online system modifies the component by selecting a replacement item and replacing the item from the physical document with the replacement item. To select the replacement item, the online system selects a set of candidate replacement items and applies the interaction model to each combination of a candidate replacement item and the component, generating a candidate score for each candidate replacement item. Based on the candidate scores, the online system selects a candidate replacement item as the replacement item for the component. Hence, the online system modifies a component comprising an item by replacing the item from the physical document included in the component with a replacement item resulting in a higher probability of the user performing the specific interaction with the component. This replacement of an item from the physical document with a replacement item personalizes a corresponding component from the item preselected by the source for the physical document to a replacement item more relevant to the user based on historical interactions by the user with the online system.

However, when selecting a replacement item for a component comprising the item, candidate scores for candidate replacement items included in the component may be less than the threshold score (or less than a threshold candidate score that differs from the threshold score). In various embodiments, rather than replace the item comprising the component with a candidate replacement item having a candidate replacement score that is less than the threshold score (or the threshold candidate score), the online system modifies the component by removing the component. As many users access content from the online system through user client devices having limited display areas, removing components for which the online system is unable to determine replacement content resulting in at least a threshold score (or a threshold candidate score) for the component reduces an amount of the display area of a client device presenting different components. This more efficiently uses the display area of a user client device for present components having content with which the user has at least the threshold probability of performing the specific interaction.

For a component comprising content other than an item (e.g., text, images) the online system generates alternative content for inclusion in the component in place of the content selected by the source for the physical document. In various embodiments, the online system generates a prompt for a generative model including the content from the physical document comprising the component, an identifier of the component, one or more formatting instructions, and an instruction to modify the content from the physical document comprising the component. The formatting instructions include a font style, a font size, a color scheme, or other descriptive information about presentation of text in some embodiments. Similarly, the formatting instructions may include a reference image providing an example for styling of the alternative content, the reference image may show characteristics of a background, characteristics of a border, or other characteristics describing visual characteristics of the alternative content. The online system applies the generative model, such as a large language model (LLM) or a multi-modal LLM, to the prompt, and the generative model generates alternative content for the component based on the prompt.

In some embodiments, the online system modifies the component by replacing content from the physical document comprising the component with the alternative content (i.e., the content generated by the generative model). However, in other embodiments, the online system validates the alternative content before replacing the content from the physical document comprising the component with the alternative content. To validate alternative content, the online system applies the interaction model to characteristics of the user, attributes of the component including the alternative content, attributes of the physical document, and characteristics of the source to generate an alternative score for the component. In response to the alternative score equaling or exceeding the threshold score (or equaling or exceeding an alternative threshold score), the online system modifies the component by replacing the content included in the component with the alternative content (i.e., the content generated by the generative model).

In some embodiments, in response to the alternative score being less than the threshold score, the online system generates an additional prompt for the generative model including the alternative content and one or more instructions to modify the alternative content. In response to the additional prompt, the generative model generates modified alternative content for the component. The online system may iteratively modify alternative content for inclusion in the component until the alternative score for the component including the alternative content equals or exceeds the threshold score in some embodiments. Further, the online system may remove the component rather than replace content from the physical document comprising the component with alternative content in response to the alternative score being less than the threshold score or in response to the alternative score being less than the threshold score after a threshold number of iterative modifications to the alternative content.

Based on the modifications to one or more components of the physical document, the online system generates an alternative document including one or more components of the physical document that are not modified and including one or more components of the physical document that have been modified by the online system. The alternative document may be a physical document or a digital document in various embodiments. The online system generates the alternative document so content from the physical document 400 comprising at least one component of the physical document remains in the alternative document, while content for one or more other components of the physical document is modified so the other components include different content in the alternative document than in the physical document. Hence, the alternative document includes a combination of content from the physical document and alternative content selected based on characteristics of the user to increase a likelihood of the user performing the specific interaction with the alternative document, while conveying content from the physical document to the user.

The alternative document may additionally or alternatively include supplemental content the online system adds to the content from the physical document. The supplemental content comprises content that is not included in the physical document. Supplemental content may comprise one or more additional items that augment items included in the physical document or replacement items included in the alternative document in place of one or more items included in the physical document. To add supplemental content to the alternative document, the online system identifies an injection point in the image of the physical document. A user, such as an administrative user associated with the source associated with the physical document may provide the online system with an input identifying the injection point in some embodiments. Alternatively, the online system applies one or more models to the image of the physical document that identify a location in the image for the injection point. In various embodiments, the injection point comprises one or more coordinates within the image of the physical document.

The online system selects a set of additional items and selects one or more of the additional items for inclusion in the alternative document at the injection point based on supplemental scores for different additional items generated by applying the interaction model to different combinations of a component 405 and additional items. For example, the online system selects a set of additional items from an item catalog of a source associated with the physical document based on an item category including items proximate to the injection point on the physical document. As another example, the online system selects additional items having embeddings with at least a threshold measure of similarity to embeddings of one or more items included in a component nearest to the injection point in the physical document. The online system applies the interaction model to attributes of the component of the physical document when each an additional item of the set is included to generate a supplemental score for each additional item. The online system selects one or more additional items based on their supplemental scores. For example, the online system selects additional items having at least a threshold supplemental score. As another example, the online system ranks the additional items based on their supplemental scores and selects one or more additional items having at least a threshold position in the ranking. When selecting additional items based on the ranking, the online system may select additional items having at least the threshold position in the ranking and having supplemental scores that equal or exceed the threshold supplemental score.

In various embodiments, the online system generates a prompt including characteristics of the component to include the additional item and attributes of the additional item for the generative model. The prompt may also include one or more formatting instructions, as further described above. In response to the prompt, the generative model generates text or image content for the additional item, and the online system includes the generated text or image content for the additional item in the alternative document at the injection point. Other supplemental content, such as additional text or images, may be additionally or alternatively included in the alternative document at one or more additional or alternative injection points in some embodiments.

Leveraging characteristics of the user and the attributes of different components of the physical document in the interaction model allows generation of an alternative document for presentation to the user. The alternative document includes content more specifically tailored to the user than the physical document, while maintaining certain content from the physical document for presentation to the user. Modifying one or more components of the physical document based on characteristics of the user generates an alternative document including alternative content that increases a likelihood of the user performing the specific interaction with one or more components relative to the physical document. Similarly, the online system 140 may remove one or more components of the physical document having less than a threshold score determined by the interaction model from the alternative document to reduce content in the alternative document with which the user is unlikely to interact. This optimizes presentation of content via display area of a user client device displaying the alternative document. The online system may also augment content in the physical document with supplemental content selected based on the characteristics of the user and attributes of the physical document when generating the alternative document to increase an amount of content in the alternative document with which the user is likely to perform the specific interaction.

In one or more embodiments, the systems and methods discussed herein can be applied to physical documents that contain promotional content, such as physical flyers or other mailings related to retail stores. In particular, such physical documents can be processed as discussed herein to personalize content for specific users of an online platform, which ingests the documents, alters them for personalization, and then distributes the altered documents (e.g., in electronic form) to various users for whom the content is personalized. To alter the documents, the online platform may identify items in the flyers, such as products offered for sale, and then alter the flyer by replacing one item with another. To determine how to replace an item, the online platform may access a database of products available at a retailer associated with the flyer, score each of a set of candidate products using an engagement prediction machine-learning model, and then select one or more of the candidate products to replace the original item in the flyer.

DETAILED DESCRIPTION

Figure 1:
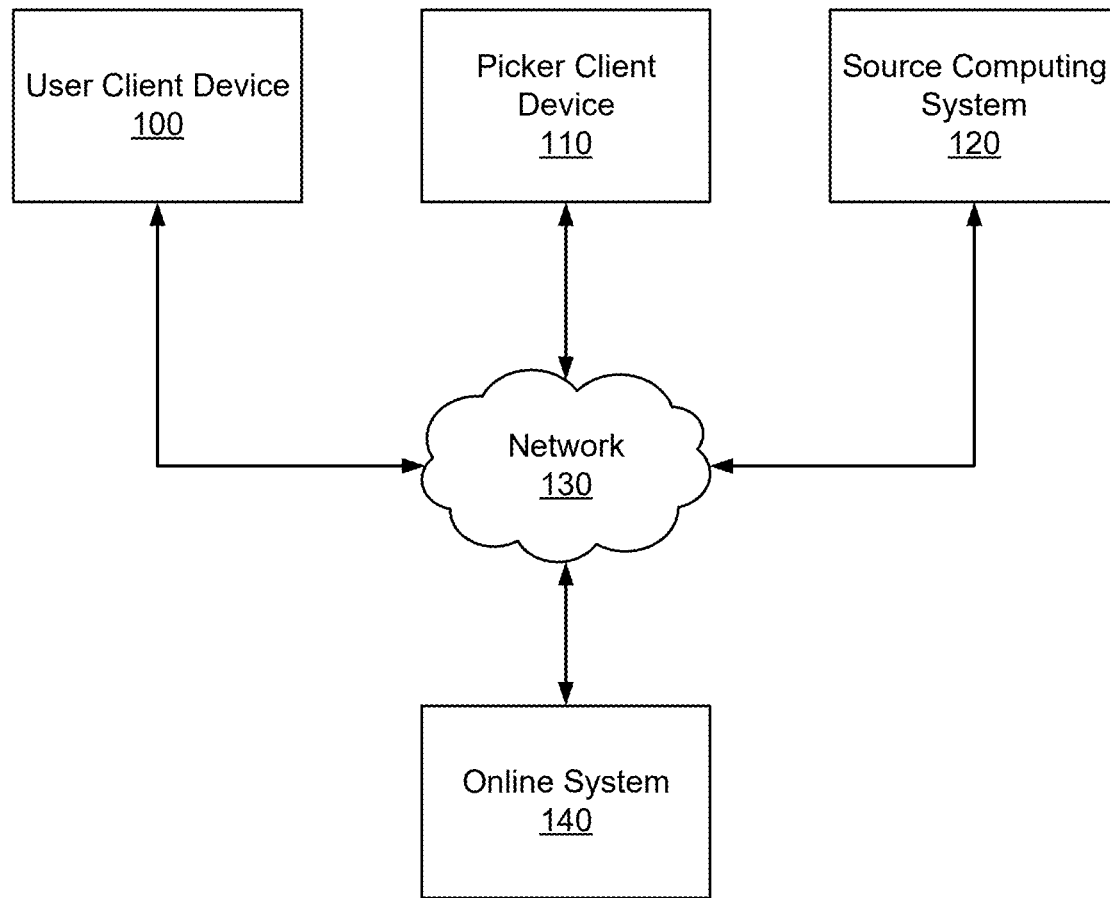
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
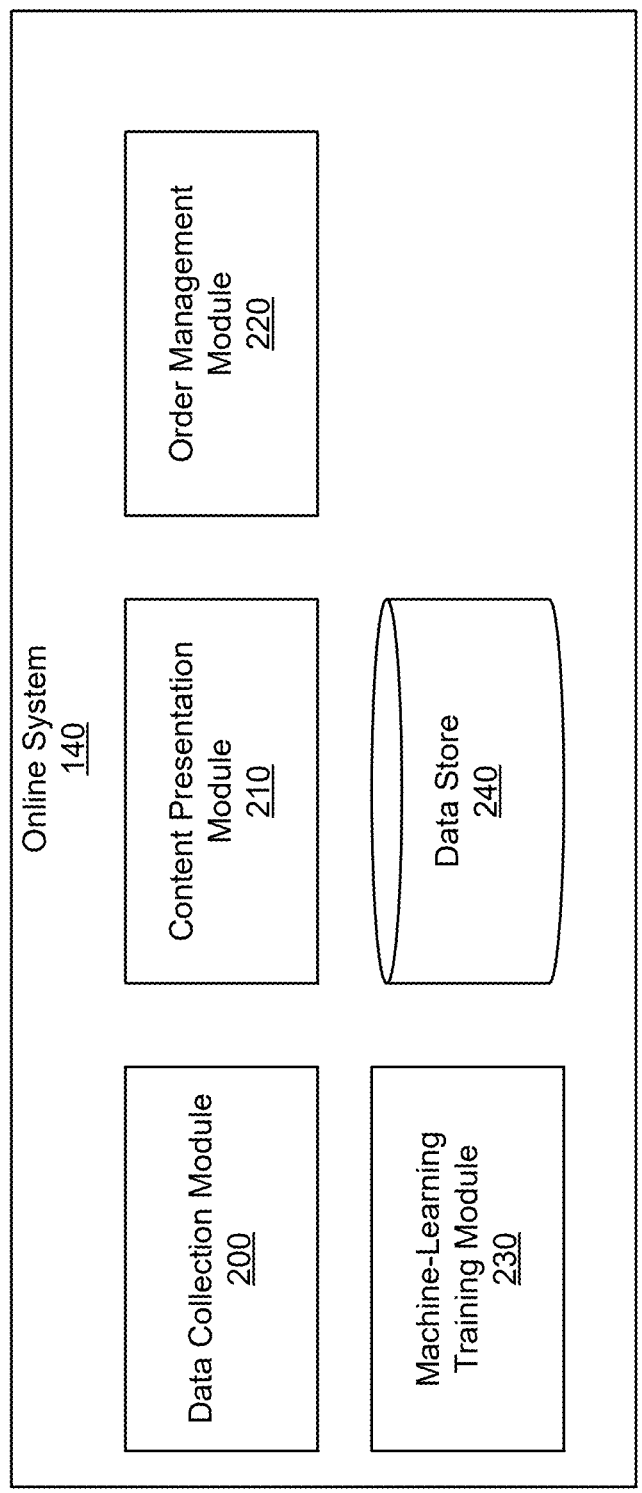
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The content presentation module 210 generates one or more alternative documents for presentation to a user in various embodiments. An alternative document may leverage content included in a physical document (or another alternative document) generated by a source, such as by a source computing system 120. The physical document includes a group of items and other content selected by the source for distribution to users of the online system 140. As the physical document includes static content, each user receiving the physical document receives common content. To account for variations in user preferences for different items, or for different content, the content presentation module 210 extracts various components from the physical document by applying one or more models to an image of the physical document. As further described below in conjunction with FIGS. 3 and 4, the content presentation module 210 applies one or more optical character recognition (OCR) models and one or more visual language models (VLMs) to the image of the physical document to extract components from text, images, and other content included in the physical document.

For each of at least a set of components extracted from the physical document, the content presentation module 210 generates a score. As further described below in conjunction with FIGS. 3 and 4, the score for a component represents a probability of a user performing a specific interaction with the component and is based at least in part on characteristics of the user (e.g., prior orders fulfilled for the user, prior interactions with content by the user) retrieved from the data store 240. In various embodiments, the content presentation module 210 applies a trained interaction model, further described below in conjunction with FIGS. 3 and 4, to characteristics of the user, attributes of the component, attributes of the physical document including the component, and characteristics of a source associated with the physical document. For example, a score for a component represents a probability of the user including an item included in the component in an order.

The content presentation module 210 compares a score for a component to a threshold score and modifies content included in the component in response to the score being less than the threshold score. For example, the content presentation module 210 selects a replacement item for an item in a component and modifies the component to include the replacement item rather than the item. As another example, the content presentation module 210 generates alternative text (or an alternative image) for a component and replaces the text from the physical document with the alternative text (or replaces an image from the physical document with the alternative image). Further, the content presentation module 210 may remove a component in response to the score for the component being less than the threshold score to modify the component. Example modifications to a component in response to the component's score being less than the threshold score are further described below in conjunction with FIGS. 3 and 4.

Based on modifications to one or more components of the physical document, the content presentation module 210 generates an alternative document for the user that includes one or more components from the physical document without modification and one or more other components from the physical document modified by the content presentation module 210. The alternative document may be a physical document or a digital document in different embodiments. The content presentation module 210 may augment content in the physical document with supplemental content, such as one or more additional items, selected based on a probability of the user performing the specific interaction with a component including an additional item, as further described below in conjunction with FIGS. 3 and 4. Hence, the alternative document includes certain content selected by the content presentation module 210 for a user based on characteristics of the user, while maintaining certain content from the physical document. This increases a probability of the user performing the specific interaction with the alternative document by including certain content specifically selected for the user.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In various embodiments, the machine-learning training module 230 trains an interaction model to generate a score representing a probability of a user performing a specific interaction with a component of a document (e.g., a physical document, a digital document). The machine-learning training module 230 applies the interaction model to multiple training examples of the training dataset. When applied to a training example, the interaction model generates the predicted score indicating a likelihood of the training user performing the specific interaction with the training component of the training document based on the attributes of the training component of the training document, characteristics of the training user, attributes of the training document, and characteristics of the source associated with the training document. The machine-learning training module 230 determines a score for the interaction model based on a difference between a label applied to an item of the training example and a predicted score for the item of the training example (e.g., through application of a loss function to the label applied to the item of the training example and the predicted foundation score for the item of the training example). A label applied to the training example indicates whether the training user performing the specific interaction with the training component; for example, the label has a specific value in response to the training user performing the specific interaction with the training component and has an alternative value in response to the training user not performing the specific interaction with the training component. The machine-learning training module 230 updates the set of parameters for the interaction model based on the score generated by the loss function until one or more criteria are satisfied.

The machine learning training module 230 trains or obtains one or more generative models in some embodiments. A generative model, such as a large language model (LLM), receives an input including a prompt and generates output based on the received input. For example, a generative model is a large language model (LLMs) previously trained on a large text corpus to learn relationships between different portions of text, such as between different words. Based on the previously learned relationships, the LLM generates output text from text received as input based on a prompt received as input. For example, a generative model receives a prompt including one or more formatting instructions and text data as input and generates output text in a format specified by the one or more formatting instructions and based on the input text and previously learned relationships between various text.

In various embodiments, the machine learning training module 230 trains or obtains one or more models for extracting text from an image. For example, the machine learning training module 230 obtains one or more optical character recognition models that extract text from an image. As another example, the machine learning training module 230 obtains a multimodal large language model (LLM) that receives input having a particular mode or type and generates output having an alternative mode or type. For example, a multimodal LLM receives an image as an input and generates text output based on the input image. The machine learning training module obtains or trains multiple models that extract text from an image in various embodiments.

In various embodiments, the machine learning training module 230 obtains a visual language model comprising a multimodal generative model that receives an image and text data as input. The visual language model generates an output based on the received image and text data. For example, the visual language model generates text data based on the received image and text data. As another example, the visual language model generates an output image based on the received image and text data. The visual language model is pre-trained on a set of multimodal training data, with the multimodal training data comprising an image and text corresponding to the image. Text corresponding to an image in the multimodal training data may be captions describing the image, labels of objects included in the image, or other descriptive information about the image. In some embodiments, the visual language model is pre-trained to perform one or more specific tasks, such as visual question answering, where the visual language model receives an image and a question about the image and generates an answer to the question based on the image. Pre-training of the visual language model for visual question answering may be performed by applying the visual language model to training examples each including a question and an image, with each training example labeled with an answer corresponding to the question included in the training example.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
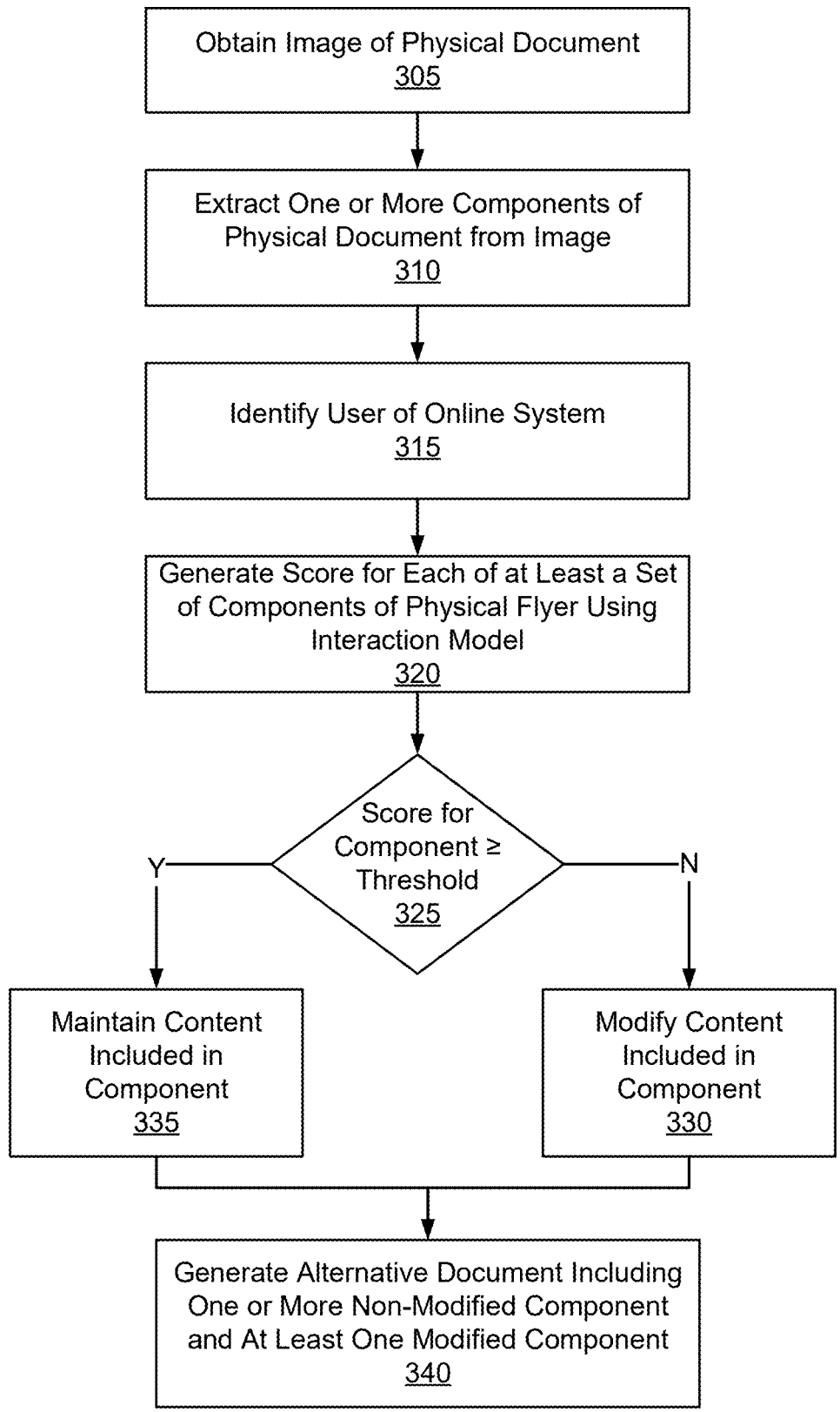
FIG. 3 illustrates a flowchart of a method for modifying one or more components of a physical document based on characteristics of a user of an online system to generate an alternative document for the user, in accordance with one or more embodiments.

FIG. 3 is a flowchart of a method for modifying one or more components of a physical document based on characteristics of a user of an online system to generate an alternative document for the user, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

A source offers various items for acquisition by a user. For example, a source is a physical location from which a user obtains one or more physical items. As another example, a source provides digital items to a user that the user obtains from the source via a user client device 100 or another client device. To simplify acquisition of items from one or more sources, an online system 140 may identify items from one or more sources to a user. The user selects a source via the online system 140 and selects one or more items from the selected source through the online system 140. Subsequently, the online system 140 obtains the selected items from the source and delivers the selected items to a location identified by the user.

A source may distribute one or more documents to users of the online system 140 to encourage a user to obtain items offered by the source more frequently or to obtain a greater number of items from the source. For example, a document identifies a group of items offered by the source to increase awareness of the group of items to users of the online system 140. Additionally or alternatively, a document may identify one or more promotions for one or more items offered by the source, such as discounted prices for one or more items offered by the source or opportunities to obtain combinations of items from the source. Distributing documents identifying items or promotions to users of the online system 140 allows a source to increase a number of the users who visit a physical location of the source or who access a third party system associated with the source via the online system 140 or through another application executing on a user client device 100.

Many documents created and distributed by a source are physical documents designed to be printed and physically distributed to multiple users of the online system 140. For example, a source mails a physical document to a location associated with a user of the online system 140 by the source. As another example, a source includes physical documents within a physical location of the source that users of the online system 140 may obtain or may review while in the physical location of the source. To facilitate mass distribution of a physical document, a source preselects the group of items to include in the physical document, so each copy of the physical document includes the group of items. While this simplifies creation of the physical document, content included in the physical document is static, so each user receiving a physical document is presented with common content. This prevents the physical document from accounting for user-specific preferences for items or aversions to items offered by the source for different users of the online system 140.

For example, various users of the online system 140 may be more likely to obtain certain items from a source that are not included in the group of items the source selected for inclusion in a physical document. Such preference of different users of the online system 140 for different items causes receipt of the physical document to have varying amounts of influence on different users obtaining items from the source. Similarly, users of the online system 140 may have an aversion to specific items offered by the source that are included in the physical document, which reduces a number of items in the physical document that such users are likely to obtain, inefficiently using the limited display area of the physical document for presenting items that such users are likely to obtain.

As the online system 140 maintains characteristics of users, including orders previously fulfilled by the online system 140 for users, the online system 140 leverages the user-specific information and the content in a physical document for a source to create an alternative document including content tailored for the user that increases a likelihood of a user obtaining items from a source through the online system 140. The online system 140 obtains 305 an image or another digital representation of the physical document. For example, the source that created the physical document captures an image of the physical document and transmits the image of the physical document to the online system 140. As another example, a user of the online system 140 captures an image of the physical document and transmits the physical document to the online system 140. In various embodiments, the online system 140 obtains an identifier of the source associated with the physical document in conjunction with the physical document. Alternatively, the online system 140 identifies the source associated with the physical document from content extracted from the image of the physical document.

To leverage content included in the physical document, the online system 140 extracts 310 one or more components of the physical document from the image (or other digital representation) of the document. For example, the online system 140 applies one or more optical character recognition models to the image of the physical document to extract 310 components comprising text from the image of the physical document. As the physical document may include content other than text, such as images, the online system 140 applies one or more visual language models (VLMs) to the image of the physical document to extract 310 components of the physical document corresponding to from non-textual portions of the image.

A visual language model (VLM) comprises a multimodal generative model that receives an image and text data as input. The VLM generates an output based on the received image and text data. For example, the VLM generates text data based on the received image and text data. The VLM is pre-trained on a set of multimodal training data, with the multimodal training data comprising various combinations of images and text corresponding to each image. Different images and corresponding text are included in the multimodal training data so the VLM learns relationships between different content of images and different text. In some embodiments, the VLM is pre-trained to perform one or more specific tasks, such as visual question answering, where the VLM receives an image and a question about the image as input and generates an answer to the question based on the image. For example, the online system 140 applies a VLM to the image and to a prompt requesting the VLM identify one or more items included in the image. As another example, the online system 140 applies a VLM to the image and to a prompt requesting the VLM identify one or more attributes of each item included in the image. In various embodiments, the online system 140 applies the VLM to various combinations of the image and different prompts to extract 310 different components of the physical document from the image. Further, in various embodiments, the online system 140 applies multiple VLMs to the image to extract 310 components of the physical document from non-textual portions of the image.

Various types of components may be extracted 310 from the image of the physical document. Example components include: items identified by the physical document, images included in the physical document, text descriptions of items included in the physical document, metadata associated with an item included in the physical document (e.g., a price of the item, a quantity of the item, etc.), text headlines included in the physical document, text section titles or descriptions included in the physical document, or other types of visual content included in the physical document. The online system 140 may store a type in association with each extracted component to provide additional information about each extracted component. The online system 140 stores the components of the physical document in association with an identifier of the physical document. In some embodiments, a component extracted 310 from the physical document is an identifier of a source associated with the physical document.

In some embodiments, the online system 140 applies one or more rules to certain types of components extracted 310 from the document to modify content comprising the certain types of components. A rule specifies a type of component and identifies content maintained by the online system 140 for replacing content of a component having the specified type. So, application of the rule replaces content from the physical document comprising a component having the specified type with content maintained by the online system 140 for the specified type, updating the content for the specified type of component based on content identified by the rule. For example, a component comprises a price of an item offered by the source, which is based on a user obtaining the item directly from the source; however, obtaining the item from the source via the online system 140 changes a price of the item. In the preceding example, the online system 140 applies a rule to extracted components having a type of metadata comprising a price of an item that replaces the price of the item in the extracted component with a price of the item when obtained via the online system 140. Application of such rules allows the online system 140 to modify content comprising one or more components from content specific to the source to alternative content the online system 140 maintains for the one or more components. Referring to the previous example, replacing a price included in a component that is metadata for an item included in the physical document with an alternative price for the item maintained by the online system 140 allows the online system to modify certain components to include content (e.g., the alternative price) specific to the online system 140 rather than to the source. Other rules may identify different types of components extracted 310 from the image of the physical document for which the online system 140 replaces content from an identified component with corresponding alternative content maintained by the online system 140 so the different types of components reflect include corresponding content specific to the online system rather than content specific to the source included in the physical document.

While the physical document includes a group of items preselected by the source for presentation to each user receiving the physical document, one or more items not included in the group may be more relevant to certain users receiving the physical document than items included in the physical document. Similarly, certain items included in the group may not be relevant to certain users who receive the physical document. As the source is unable to customize items or other content included in the physical document for individual users of the online system 140, the physical document may inefficiently present items to various users, which reduces a likelihood of various users obtaining one or more items from the source after receiving the physical document.

To increase a likelihood of content from the physical document causing users to obtain one or more items from the source, the online system 140 identifies 315 a user and retrieves stored characteristics of the user, including items that different users previously obtained in orders and prior interactions of users with components of documents or other content that the online system previously presented to the user. In some embodiments, the user may be identified 315 by a source associated with the physical document, while in other embodiments the online system 140 identifies 315 a user having one or more specific characteristics. Example characteristics of the user that the online system 140 retrieves include prior orders that the online system 140 fulfilled for the user, prior interactions by the user with content previously presented by the online system 140, a location associated with the user, one or more preferences associated with the user, demographic information of the user, or other descriptive information about the user or about prior interactions by the user with the online system 140. The online system 140 leverages the retrieved characteristics of the user to generate 320 a score for each component extracted 310 from the physical document, or for each of a set of components extracted 310 from the physical document.

The online system 140 applies an interaction model to the characteristics of the user, the attributes of a component, the attributes of the physical document, and to the characteristics of the source associated with the document to generate 320 a score for a component of the physical document. Example attributes of the component of the physical document include: a type of the component of the physical document, content included in the component of the physical document, types of components adjacent to the component in the physical document, or other descriptive information about the component of the physical document. Example attributes of the physical document include: a number of components of the physical document, a size of the physical document, a date for presenting the physical document to the user, types of components included in the physical document, relative positioning of components of the physical document to each other, or other information describing content and presentation of content by the physical document. Characteristics of the source associated with the physical document include: a location of the source associated with the physical document, an item catalog of the source associated with the physical document, one or more prior orders from the users fulfilled via the source associated with the physical document, or other descriptive information about the source associated with the physical document.

As the score is generated 320 based at least in part on characteristics of the user, which include prior interactions by the user, the score comprises an indication of a likelihood of the user performing a specific interaction with the component. For example, the score is based on a probability of the user selecting the component of the physical document. As another example, the score is based on a probability of the user including an item included in the component in an order received by the online system 140. In various embodiments, the score is based on a combinations of probabilities of the user performing different or additional interactions with the component of the physical document. For example, the online system 140 applies multiple interaction models to the characteristics of the user, the attributes of the component, the attributes of the physical document, and to the characteristics of the source associated with the document, with each interaction model determining an interaction-specific score for a different specific interaction, and generates 320 the scores for the component by combining multiple interaction-specific scores.

In various embodiments, the online system 140 trains the interaction model based on prior interactions by the user with components of documents previously presented to the user via the online system 140. The online system 140 may leverage prior interactions by other users with components of documents previously presented to the other users in various embodiments. The other users may have one or more common characteristics with the user in some embodiments.

The interaction model comprises a set of weights stored on a non-transitory computer readable storage medium. The online system 140 trains the interaction model by generating a training dataset including multiple training examples based on prior interactions by a training user (or by various training users) with training components of documents (or other content) previously presented to the training user (or to the various training users). Each training example includes attributes of a training component of a training document, characteristics of the training user, attributes of the training document, and characteristics of a source associated with the training document. Example attributes of the training component of the training document include: a type of the component of the training document, content included in the training component of the training document, types of components adjacent to the training component in the training document, or other descriptive information about the training component in the training document. Example characteristics of the training user include: a location associated with the training user, demographic information associated with the training user, one or more prior orders the online system 140 fulfilled for the training user, prior interactions by the training user with content presented by the online system 140, or other descriptive information about the training user. Example attributes of the training document include: a number of components of the training document, a size of the training document, a date the training document was presented to the training user, types of components included in the training document, relative positioning of components of the training document to each other, or other information describing content and presentation of content by the training document. Characteristics of the source associated with the training document include: a location of the source associated with the training document, an item catalog of the source associated with the training document, one or more prior orders from the users fulfilled via the source associated with the training document, or other descriptive information about the source associated with the training document. Additionally, each training example includes a label indicating whether the training user performed the specific interaction with the training component of the training document. For example, a label has a particular value in response to the training user including an item from the training component of the training document in an order from the source associated with the training document and has an alternative value in response to the training user not including an item from the training component of the training document in an order from the source associated with the training document.

To train the interaction model, the online system 140 initializes the set of weights comprising the interaction model and applies the interaction model to multiple training examples of the training dataset. Applying the interaction model to multiple training examples updates one or more parameters (e.g., the weights) comprising the interaction model. The parameters comprising the interaction model transform the input data-attributes of a component of a document, characteristics of the training user, attributes of the document, and characteristics of a source associated with the document-into a predicted score. When applied to a training example, the interaction model generates the predicted score indicating a likelihood of the training user performing the specific interaction with the training component of the training document based on the attributes of the training component of the training document, characteristics of the training user, attributes of the training document, and characteristics of the source associated with the training document.

For each training example to which the interaction model is applied, the online system 140 generates a score comprising an error term based on the predicted score for the training example and a label applied to the training example. The error term is larger when a difference between the predicted score for the training example and the label applied to the training example is larger and is smaller when the difference between the predicted score for the training example and the label applied to the training example is smaller. In various embodiments, the online system 140 generates the error term using a loss function based on a difference between the predicted score for the training example and the label applied to the training example using a loss function. Example loss functions include a mean square error function, a mean absolute error, a hinge loss function, and a cross-entropy loss function.

The online system 140 backpropagates the error term to update the set of parameters comprising the interaction model and stops backpropagation in response to the error term, or to the loss function, satisfying one or more criteria. For example, the online system 140 backpropagates the error term through the interaction model to update parameters of the interaction model until the error term has less than a threshold value. For example, the online system 140 may apply gradient descent to update the set of parameters. The online system 140 stores the set of parameters comprising the interaction model on a non-transitory computer readable storage medium after stopping the backpropagation.

By generating 320 a score for each of a set of components of the physical document (or for each component of the physical document) using the interaction model, the online system determines a probability of the user performing the specific interaction with each component of the set of components (or with each component of the physical document). This allows the online system 140 to leverage stored characteristics of the user, including prior interactions by the user with the online system 140, to evaluate a probability of the user performing the specific interaction with different components included in the physical document based on content included in different components of the physical document by the source. Generating scores for different components of the physical document allows the online system 140 to assess how different content included in different components of the physical document influences a probability of the user performing the specific interaction.

The online system 140 determines 325 whether a score for a component of the physical document is less than a threshold score. In various embodiments, the online system 140 maintains different threshold scores for different types of components to account for variations in content in different components of the physical document and different rates of interaction by the user with different components of digital documents (or with other physical documents). Alternatively, the online system 140 maintains a common threshold score applicable to multiple components of the physical document. In some embodiments, the online system 140 maintains different threshold scores for different users. Similarly, the online system 140 may maintain different threshold scores for different sources. A threshold score provides a minimum probability of the user performing the specific interaction with a component of the physical document.

In response to determining a score for a component of the physical document is less than a threshold score, the online system 140 modifies 330 content included in the component of the physical document. Modifying the content comprising the component of the physical document having less than the threshold score allows the online system 140 to increase the probability of the user performing the specific interaction with the component of the physical document using alternative content from the content the source included in the physical document for the component. In various embodiments, the online system 140 differently modifies 330 different types of components of the physical document to increase a probability of the user performing the specific interaction with the component. Similarly, the online system 140 may differently modify 330 a component of the physical document in different embodiments.

For example, a component of the physical document comprises an item. In response to the score of the item of the physical document being less than the threshold score, the online system 140 modifies 330 the component by selecting a set of candidate replacement items for the item comprising the component. When selecting the set of candidate replacement items, the online system 140 accounts for additional components of the physical document in various embodiments. For example, the online system 140 identifies additional items in a common section of the physical document as the item and selects candidate replacement items based on the additional items and on the item from an item catalog of the source. As an example, the online system 140 determines an item category including the item and including a threshold amount of the additional items in the common section of the physical document as the item and selects items from the source's item catalog having the determined item category as the set of candidate replacement items.

The online system 140 generates a candidate score for each candidate replacement item by applying the interaction model to characteristics of the user, attributes of the component including the candidate replacement item (in place of the item), attributes of the physical document, and characteristics of the source. Based on the candidate scores for corresponding candidate replacement items, the online system selects a replacement item to replace the item. For example, the online system 140 ranks the candidate replacement items based on their candidate scores and selects the replacement item as a candidate replacement item having at least a threshold position in the ranking (e.g., having a highest position in the ranking). Alternatively, the online system 140 selects the replacement item as a candidate replacement item having a maximum candidate score. The online system 140 modifies 330 the component of the physical document by replacing the item comprising the component with the selected replacement item. This modifies the content of the physical document by replacing an item with which the user has less than a threshold probability of performing the specific interaction determined by the score of the component comprising the item with a replacement item with which the user has a higher probability of performing the specific interaction. Generating a candidate score for each candidate replacement item accounts for the characteristics of the user when determining a probability of the user performing the specific interaction with different candidate replacement items.

In various embodiments, the online system 140 determines adjusted candidate scores for each candidate replacement item and selects the replacement item based on the adjusted candidate scores. For example, an adjusted candidate score for a candidate replacement item is based on a combination of the candidate score for the replacement item and an amount of compensation the online system 140 receives from an entity (e.g., the source, a manufacturer, etc.) associated with the candidate replacement item. For example, the online system 140 converts the candidate score for a candidate replacement item and the amount of compensation received for the candidate replacement item into a common unit of measurement and determines the adjusted candidate score as a sum (or other combination) of the amount of compensation and the candidate score in the common unit of measurement. The online system 140 applies a conversion factor to the candidate score or to the amount of compensation to convert the quantities into a common unit of measurement. The online system 140 selects a candidate replacement item based on the adjusted candidate scores, as further described above (e.g., based on a ranking, based on comparing adjusted candidate scores to a threshold, etc.).

When replacing an item with a replacement item, the online system 140 identifies additional components associated with, or proximate to, the component comprising the item, in various embodiments. For example, the additional components comprise metadata for the item, such as a price of the item, a description of the item, an image of the item, or other information describing the item. The online system 140 replaces the metadata for the item with corresponding metadata for the replacement item. In some embodiments, the online system 140 leverages a generative model to generate or to select replacement metadata for one or more additional components. For example, the online system 140 applies the generative model to a prompt including an identifier of the replacement item and one or more attributes of the replacement item (e.g., images of the replacement item, a name of the replacement item, a description of the replacement item, etc.) and an instruction to generate a particular type of metadata for the replacement item (e.g., an image, a description). The generative model generates the particular type of metadata for the replacement item, and the online system 140 modifies a component comprising the particular type of metadata for the item with the generated metadata.

In various embodiments, the online system 140 also compares each candidate score to a threshold candidate score. The threshold candidate score is the candidate score in some embodiments, while in other embodiments the threshold candidate score has a different value than the threshold score. For example, the threshold candidate score is greater than the threshold score. The online system 140 compares each candidate score for a candidate replacement item to the threshold candidate score. In various embodiments, the online system 140 selects a candidate replacement item from a ranking based on candidate scores and determines whether the candidate score for the selected candidate replacement item equals or exceeds the threshold candidate score. In response to the candidate score equaling or exceeding the threshold candidate score, the online system 140 users the selected candidate replacement item as the replacement item for the item. However, in response to no candidate replacement item having a candidate score equaling or exceeding the threshold candidate score, the online system 140 modifies 330 the component by removing the component from the physical document.

As the threshold candidate score specifies a minimum probability of the user performing the specific interaction with a replacement item, if no candidate replacement item has a score equaling or exceeding the candidate score, replacing the item with a replacement item does not result in the user having at least the minimum probability of the user performing the specific interaction. Rather than include a different item as the component, which would not increase a probability of the user performing the specific interaction with the component, the online system 140 modifies the component by removing the component in response to each candidate replacement item having a candidate score less than the candidate score threshold. This reduces a number of items relative to the number of items in the physical document, reducing an amount of a display area (e.g., an amount of a display device of a user client device 100) that presents items from the physical document with which the user has less than the minimum probability of performing the specific interaction.

As the physical document includes types of components comprising content other than items, in response to a component comprising content other than an item having a score less than the threshold score, the online system 140 generates alternative content to replace the content from the physical document comprising the component. For example, a component comprises text (e.g., a headline, a section title, etc.) from the physical document, and the online system 140 generates alternative text to replace the text. Similarly, a component comprises an image, such as an image of an item, from the physical document and the online system 140 generates or selects an alternative image to replace the image. In various embodiments, the online system 140 generates a prompt that includes the content comprising the component (e.g., text or image) with the score less than the threshold score, an identifier of the component, one or more formatting instructions, and an instruction to modify the component. Subsequently, the online system 140 applies a generative model, such as a large language model (LLM) or a multi-modal LLM, to the prompt. The generative model leverages relationships between portions of text or between text and other content learned during a pre-training process to generate text or an image based on the received prompt. The output of the generative model comprises alternative content for replacing the content from the physical document comprising the component having the score less than the threshold score. For example, the generative model generates one or more words or phrases for replacing text from the physical document comprising a component of the physical document; text generated by the generative model may be an alternative section title, an alternative headline, an alternative description, or other alternative text comprising a component of the physical document. As another example, the generative model generates an alternative image for replacing an image of an item or another image included in the physical document.

The prompt for the generative model to generate the alternative content includes one or more formatting instructions in various embodiments. For example, formatting instructions specify a font size, a font style, a font color, text style information, color information, or other information describing presentation and formatting of text. In other examples, the formatting instructions include a reference image providing an example of visual features to include in images or text generated by the generative model. Including the formatting instructions in the prompt allows the alternative content to appear visually similar to other content included in the physical document or allows the alternative content to have different visual features than content included in the physical document.

In some embodiments, the online system 140 validates the alternative content generated for the component prior to modifying the component by replacing the content from the physical document with the alternative content. To validate alternative content, the online system 140 generates an alternative score for the component including the alternative content. The online system 140 applies the interaction model to characteristics of the user, attributes of the component including the alternative content, attributes of the physical document, and characteristics of the score, as further described above. In response to the alternative score equaling or exceeding the threshold score, the online system 140 modifies 330 the component by replacing the content from the physical document included in the component with the alternative content (i.e., the content generated by the generative model). In some embodiments, in response to the alternative score being less than the threshold score, the online system 140 generates an additional prompt for the generative model including the alternative content and one or more instructions to modify the alternative content, so the generative model generates modified alternative content for the component in response to the additional prompt. The online system 140 may iteratively modify alternative content for inclusion in the component until the alternative score for the component including the alternative content equals or exceeds the threshold score in some embodiments. Comparing the alternative score to the threshold score prevents the online system 140 before modifying 330 the component prevents modification of the content from the physical document with alternative content unless the alternative content results in at least a threshold probability of the user performing the specific interaction with the component.

In some embodiments, the online system 140 generates multiple candidate documents that each replace at least one component with a score less than the threshold score with alternative content. Different candidate documents may replace content from a component with different alternative content. Additionally or alternatively, different candidate documents replace content comprising different components. The online system 140 generates a candidate score for each candidate document using the interaction model, as further described above. In some embodiments, the online system 140 combines candidate scores for each component of a candidate document to generate the candidate score for the candidate document. The candidate score for a candidate document provides an indication of a probability of the user performing the specific interaction with the candidate document, so candidate scores for different candidate documents account for effects of different modifications to one or more components of the physical document (e.g., different alternative content for components, removal of different components, etc.). In some embodiments, the online system 140 ranks the candidate documents based on their corresponding candidate scores and selects a candidate document having a highest position in the ranking, or having a threshold position in the ranking. The online system 140 subsequently modifies 330 one or more components of the physical document based on the selected candidate document. Hence, the online system 140 replaces content comprising one or more components of the physical document with corresponding alternative content from the selected candidate document for the one or more components to modify 330 the one or more components of the physical document.

The online system 140 may additionally or alternatively augment content included in the physical document with supplemental content. To include supplemental content in addition to content from the physical document, the online system 140 identifies an injection point within the physical document for the supplemental content. In some embodiments, the online system 140 receives a selection of an injection point within the physical document from a specific user, such as an administrator. As another example, the online system 140 applies one or more models to the image of the physical document (and to characteristics of the user) that identify an injection point as a location within the physical document for supplemental content. The injection point may be identified as specific coordinates within the physical document in some embodiments, while in other embodiments the injection point comprises a horizontal line or a vertical line at a specific coordinate within the physical document. Subsequently, the online system 140 determines supplemental content for inclusion at the injection point and modifies the physical document so the determined supplemental content is included at the injection point.

In various embodiments, the supplemental content comprises one or more additional items included in addition to items included in the physical document or in addition to replacement items that replaced one or more items included in the physical document. The online system 140 selects a set of additional items. For example, the online system 140 selects a set of additional items from an item catalog of a source associated with the document based on an item category including items proximate to the injection point on the physical document. For example, the online system 140 selects a set of additional items from an item catalog of the source associated with the physical document, with each additional item having an item category matching an item category including at least a threshold amount of other items in the component of the physical document that includes (or that is nearest to) the injection point. As another example, the online system 140 selects additional items having embeddings with at least a threshold measure of similarity to embeddings of one or more items included in a component nearest to the injection point (or including the injection point) in the physical document. For each additional item, the online system 140 applies the interaction model to the component of the physical document including an additional item to generate a supplemental score for each additional item based on characteristics of the user, attributes of the component including an additional item, attributes of the physical document, and characteristics of the source, as further described above.

Based on the supplemental scores, the online system 140 selects one or more additional items for inclusion at the injection point. For example, the online system 140 ranks the additional items by their supplemental scores and selects one or more additional items having at least a threshold position in the ranking. In some embodiments, the online system 140 also determines whether a supplemental score for an additional item having the threshold position in the ranking equals or exceeds a threshold supplemental score. The online system 140 modifies the physical document to include a selected additional item in response to the supplemental score of the selected additional item having at least the threshold position in the ranking equaling or exceeding the threshold supplemental score, but does not include the selected additional item in response to the supplemental score of the additional item having at least the threshold position in the ranking being less than the threshold supplemental score. As another example, the online system 140 selects one or more additional items having at least a threshold supplemental score for inclusion at the injection point. In other embodiments, the online system 140 selects one or more additional items having at least the threshold position in the ranking without comparing the supplemental scores of the one or more additional items to the threshold supplemental score. The online system 140 modifies the physical document by including the selected one or more additional items at the injection point.

In various embodiments, the online system 140 determines adjusted supplemental scores for each additional item and selects the replacement item based on the adjusted supplemental scores. For example, an adjusted supplemental scores for an additional item is based on a combination of the supplemental score for the additional item and an amount of compensation the online system 140 receives from an entity (e.g., the source, a manufacturer, etc.) associated with the additional item. For example, the online system 140 converts the supplemental score for an additional item and the amount of compensation received for the additional item into a common unit of measurement and determines the adjusted supplemental scores as a sum (or other combination) of the amount of compensation and the supplemental score in the common unit of measurement. The online system 140 applies a conversion factor to the supplemental score or to the amount of compensation to convert the quantities into a common unit of measurement. The online system 140 selects an additional item based on the adjusted supplemental scores, as further described above (e.g., based on a ranking, based on comparing adjusted supplemental scores to a threshold, etc.).

However, in response to determining 325 the score generated 320 for the component equals or exceeds the threshold score, the online system 140 maintains 335 the content from the physical document comprising the component. Having a score equaling or exceeding the threshold score indicates that the user has at least a threshold probability of performing the specific interaction with the component, so the online system 140 does not modify the content from the physical document comprising the component. However, in various embodiments, the online system 140 may augment a component with a score equaling or exceeding the threshold score with supplemental content, as further described above. This allows the online system 140 to maintain 335 the content from the physical document comprising the component of the physical document, while augmenting the content from the physical document with supplemental content, such as additional items, to further increase a likelihood of the user performing the specific interaction with the component.

Based on the physical document and modifications to content comprising one or more components of the physical document, the online system 140 generates 340 an alternative document. In various embodiments the alternative document comprises a physical document or a digital document. The alternative document includes at least one component from the physical document that is not modified by the online system 140 and includes one or more components from the physical document that have been modified by the online system 140, as further described above. For example, the alternative document includes components comprising section titles and headlines from the physical document that are not modified from the physical document, but includes one or more components that comprise replacement items in place of items included in the physical document. As another example, the alternative document includes one or more components comprising items included in the physical document by the source, but removes one or more components comprising items included in the physical document for which scores less than the threshold score were determined 320. In another example, the alternative document includes components from the physical document that are not modified and also includes supplemental content added by the online system 140 to the alternative document to augment the components from the physical document.

In various embodiments, the online system 140 generates 340 the alternative document by modifying 330 one or more components having a score less than the threshold score, as further described above, in the image of the physical document and maintaining 335 content from the physical document comprising one or more other components. The online system 140 subsequently saves the modified image of the physical document. Alternatively, the alternative document comprises a form generated 340 by the online system 140 including different fields that each correspond to different components of the physical document and include content from the physical document comprising a component or include modified content comprising the component. In various embodiments, the online system 140 stores the alternative document in association with an identifier of the identified user, so the alternative document is subsequently transmitted to a user client device 100 associated with the user.

Modifying one or more components of the physical document to generate 340 the alternative document leverages information maintained by the online system 140 for the identified user to modify certain content from the physical document into alternative content in the alternative document with which the user is more likely to interact. Similarly, the online system 140 may remove one or more components from the physical document to reduce an amount of content in the alternative document, allowing the alternative document to more efficiently display content with which the user is likely to interact in a display area of a user client device 100. Such modification of certain content from physical document, while retaining other content from the physical document, generates 340 an alternative document that refines content from the physical document based on user-specific preferences or prior interactions to include content tailored to the user's likelihoods of interacting with different content.

In various embodiments, the online system 140 subsequently transmits the alternative document to a customer client device 100 of the user for presentation. The customer client device 100 presents the alternative document to the user. As the alternative document includes one or more components modified by the online system 140, the alternative document includes content specifically selected for the user based on characteristics of the user and attributes of the physical document from the source, as well as content previously included in the physical document. Modifications to one or more components based on the scores indicating probabilities of the user performing the specific interaction with different components of the physical document when generating 340 the alternative document make more efficient use of a display area of a user client device 100 presenting the alternative document by presenting content with which the user is more likely to perform a specific interaction. Similarly, modifying one or more components of the physical document based on the scores indicating probabilities of the user performing the specific interaction tailors content included in one or more components of the alternative document based on historical interactions by the user.

Figure 4:
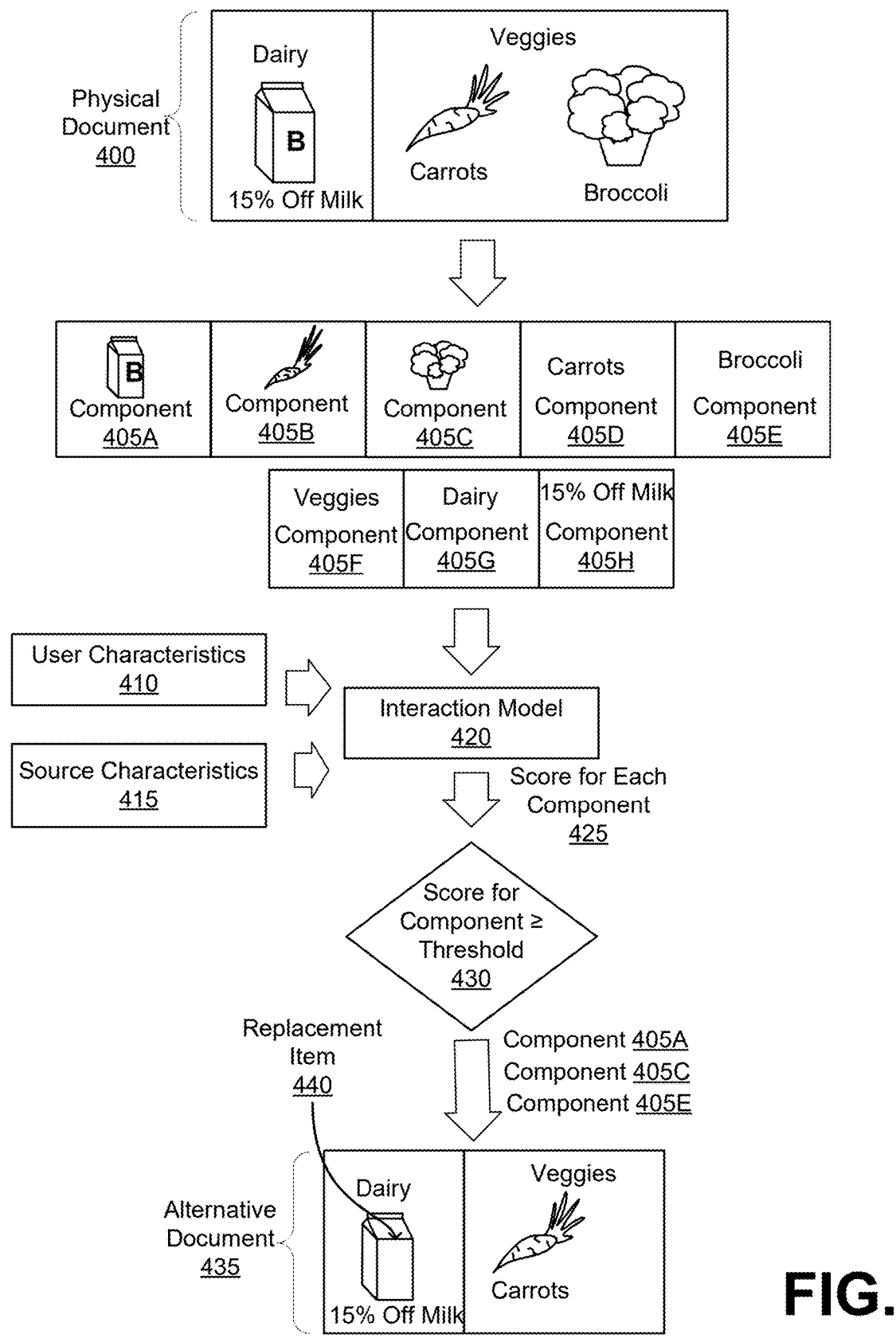
FIG. 4 illustrates a process flow diagram of a method for modifying one or more components of a physical document based on characteristics of a user of an online system to generate an alternative document for the user, in accordance with one or more embodiments.

FIG. 4 is a process flow diagram of a method for modifying one or more components of a physical document based on characteristics of a user of an online system 140 to generate an alternative document for the user. The online system 140 enables users to select items offered by one or more sources, which the online system 140 subsequently obtains for the users. For example, the online system 140 receives an order including one or more items and identifies a source from which the items are to be obtained. Subsequently, the online system 140 obtains the selected items from the identified source and delivers the obtained items to a location identified by the order.

To increase a number of items obtained by users or to increase a frequency with which users obtain items, a source may distribute a physical document 400 to users of the online system 140. The physical document 400 includes a group of items preselected by the source and other content, such as images or text, preselected by the source for distribution to multiple users. The physical document may also identify promotions offered by the source for obtaining items. Conventionally, the physical document 400 is mass distributed to multiple users, with content included in the physical document 400 common to each user receiving the physical document. For example, the source mails the physical document 400 to addresses of users of the online system 140. As another example, the source provides the physical document 400 to users of the online system 140 through one or more physical locations of the source that users visit.

For example, the physical document 400 identifies a group of items offered by the source to increase awareness of the group of items to users of the online system 140. Additionally, the physical document 400 may also identify one or more promotions offered by the source, such as discounted prices for one or more items offered by the source or opportunities to obtain combinations of items from the source. While preselecting content to include in the physical document 400 simplifies creation of the physical document 400, including common content in each copy of the physical document does not account for user-specific preferences for different items. Various users of the online system 140 may be more likely to obtain certain items from the source that are not included in the group of items in the physical document 400, so the physical document 400 has limited influence on those users obtaining items from the source. Similarly, users of the online system 140 may have an aversion to specific items offered by the source, and inclusion of one or more of those specific items in the physical document 400 decreases an amount of the physical document 400 available for presenting items more relevant to the users. Additionally, certain attributes of one or more items included in the physical document 400 may differ when a user obtains the item from the source directly or obtains the item from the online system 140, and the physical document 400 does not reflect the attributes of the items when obtained via the online system 140.

As the online system 140 maintains characteristics of users, including orders that the online system 140 previously fulfilled for the user and prior interactions by users with content presented by the online system 140, the online system 140 may leverage the maintained characteristics of users to generate personalized content for a user based on the physical document 400. By leveraging items offered from a source identified in the physical document and characteristics of a user, the online system 140 generates content from the physical document 400 that is personalized for distribution to a particular user. To generate such personalized content, the online system 140 obtains an image, or other representation, of the physical document 400 and extracts one or more components of the physical document 400. For example, the online system 140 applies a combination of models to the image of the physical document 400 that extract different components of the physical document 400. As further described above in conjunction with FIG. 3, the online system 140 applies a combination of one or more optical character recognition (OCR) models and one or more visual language models (VLMs) to the image of the physical document 400 to extract text components or components based on text and images included in the physical document 400. Example components of the physical document 400 include: items identified by the physical document 400, metadata associated with items identified by the physical document (e.g., a price, a name, a description, an image), section titles or descriptions within the physical document 400, images included in the physical document 400, descriptions of items included in the physical document 400, headings included in the physical document 400, as well as other information included in the physical document 400.

In the example of FIG. 4, application of one or more models to the image of the physical document 400 extracts components 405A-H (also referred to individually and collectively using reference number 405) from the image of the physical document 400. Component 405A, component 405B, and component 405C each correspond to different items included in the physical document 400. In the example of FIG. 4, component 405D, component 405E, component 405F, component 405G, and component 405H each correspond to different portions of text in the physical document 400. For example, component 405D and component 405E correspond to text descriptions of the item corresponding to component 405B and to the item corresponding to component 405C, respectively. Component 405F and component 405G correspond to headings for different sections of the physical document 400, while component 405H comprises a text promotion included in the physical document 400.

In some embodiments, the online system 140 applies one or more rules to certain types of components 405 extracted from the physical document to modify content comprising the certain types of components 405. For example, a component 405 comprises a price of an item offered by the source, which is specified in the physical document 400 based on a user obtaining the item directly from the source; however, obtaining the item via the online system 140 has a different price for the item. In the preceding example, the online system 140 applies a rule to extracted components 405 having a type of metadata comprising a price of an item that replaces the price of the item in the extracted component with a price of the item included in an item catalog for the source. Applying one or more such rules allows the online system 140 to modify content comprising one or more components 405 from content specific to the source to alternative content maintained by online system 140.

Each component 405 extracted from the physical document 400 corresponds to a portion of content of the physical document 400. With different components 405 extracted from the physical document 400, the online system 140 identifies a user and retrieves characteristics 410 of the user maintained by the online system 140. Alternatively, the online system 140 identifies a user and extracts components 405 from the physical document 400. Example characteristics of the user include: a location of the user, one or more prior orders fulfilled by the online system 140 for the user, prior interactions with content previously presented to the user by the online system 140, demographic information of the user, or other information describing the user or describing interactions previously performed by the user. Additionally, the online system 140 retrieves characteristics 415 of a source associated with the physical document 400. The online system 140 may identify the source associated with the physical document 400 from content included in the physical document 400. Alternatively, the online system 140 receives an identifier of the source associated with the physical document in conjunction with the image of the physical document 400. Example characteristics of the source include: an item catalog associated with the source identifying items offered by the source and attributes of items offered by the source, a location of the source, one or more promotions offered by the source, or other information describing the source or items available via the source.

For each component 405 of the physical document 400, the online system 140 applies an interaction model 420 to attributes of the component 405, characteristics 410 of the user, and characteristics 415 of the source associated with the physical document 400 to generate a score 425 that comprises a probability of the user performing a specific interaction with the component 405 of the physical document 400. In some embodiments, the specific interaction comprises the user including an item associated with the component 405 in an order. For another example, the specific interaction comprises the user selecting the component 405. As further described above in conjunction with FIG. 3, the online system 140 trains the interaction model 420 based on prior interactions by one or more users with components of content presented to the one or more users, characteristics of the one or more users, and attributes of sources associated with the content presented to the one or more users through a backpropagation process.

Generating the score 425 for a component 405 of the physical document based in part on characteristics 410 of the user accounts for prior interactions by the user with content presented by the online system 140, so the score 425 for a component 405 is customized for a combination of a component 405 and a user. The online system 140 leverages a score 425 for a component 405 to determine whether to modify content comprising the component 405 determines 430 whether the score 425 for the component 405 equals or exceeds a threshold score, with the threshold score specifying a minimum probability of the user performing the specific interaction with the component. In some embodiments, the online system 140 determines a type of a component 405 and retrieves a threshold score associated with the determined type, allowing the online system 140 to maintain different threshold scores for different types of components 405. For example, different threshold scores are associated with an item, with an image, and with text. Alternatively, the online system 140 maintains a single threshold score applicable to multiple types of components 405. In some embodiments, different threshold scores may be associated with different sources.

In the example of FIG. 4, the online system 140 determines 430 scores 425 for component 405A, component 405C, and component 405E are each less than the threshold score, so the online system 140 modifies content comprising each of component 405A, component 405B, and component 405E. As further described above in conjunction with FIG. 3, for a component 405 comprising an item, such as component 405A, the online system 140 modifies the component 405 by selecting a replacement item and replacing the item from the physical document 400 with the replacement item. In various embodiments, the online system 140 selects a set of candidate replacement items and generates a candidate score for the component for each candidate replacement item by applying the interaction model 420 to the attributes of the component 405 including the candidate replacement item, characteristics 410 of the user, and characteristics 415 of the source associated with the physical document 400. As further described above in conjunction with FIG. 3, the online system 140 selects a candidate replacement item as the replacement item for the component based on the candidate scores. Hence, the online system 140 modifies a component 405 comprising an item by replacing the item from the physical document 400 with a replacement item resulting in a higher probability of the user performing the specific interaction with the component 405. This replacement of an item from the physical document 400 with a replacement item personalizes a corresponding component 405 from the item preselected by the source for the physical document 400 to a replacement item more relevant to the user based on historical interactions by the user with the online system 140.

However, when selecting a replacement item for a component 405 comprising the item, candidate scores for the component 405 including candidate replacement items may be less than the threshold score (or less than a threshold candidate score that differs from the threshold score). In various embodiments, rather than replace the item comprising the component 405 with a candidate replacement item that does not result in a candidate score for the component 405 that equals or exceeds the threshold score (or the threshold candidate score), the online system 140 modifies the component 405 by removing the component 405. In the example of FIG. 4, the online system 140 determines that no candidate replacement item for the item corresponding to component 405C or component 405E results in a candidate score that equals or exceeds the threshold score (or the threshold candidate score), so the online system 140 removes component 405C and component 405E when generating content based on the physical document 400. As many users access content from the online system 140 through user client devices 100 having limited display areas, removing components 405 for which the online system 140 is unable to determine replacement content resulting in at least a threshold score (or a threshold candidate score) for the component 405 reduces an amount of the display area of a client device 100 presenting different components 405. This more efficiently uses the display area of a user client device 100 for present components 405 having content with which the user has at least the threshold probability of performing the specific interaction.

As further described above in conjunction with FIG. 3, for a component 405 comprising content other than an item (e.g., text, images) the online system 140 generates alternative content for inclusion in the component 405 in place of the content selected by the source for the physical document 400. In various embodiments, the online system 140 generates a prompt for a generative model including the content from the physical document 400 comprising the component 405, an identifier of the component 405, one or more formatting instructions, and an instruction to modify the content from the physical document 400 comprising the component 405. The formatting instructions include a font style, a font size, a color scheme, or other descriptive information about presentation of text in some embodiments. Similarly, the formatting instructions may include a reference image providing an example for styling of the alternative content, the reference image may show characteristics of a background, characteristics of a border, or other characteristics describing visual characteristics of the alternative content. The online system 140 applies a generative model, such as a large language model (LLM) or a multimodal LLM, to the prompt, and the generative model generates alternative content for the component based on the prompt.

In some embodiments, the online system 140 modifies the component 405 by replacing content from the physical document 400 comprising the component 405 with the alternative content (i.e., the content generated by the generative model). However, in other embodiments, the online system 140 validates the alternative content before replacing the content from the physical document 400 with the alternative content, as further described above in conjunction with FIG. 3. To validate alternative content, the online system 140 applies the interaction model to characteristics 410 of the user, attributes of the component 405 including the alternative content, attributes of the physical document 400, and characteristics 415 of the source to generate an alternative score for the component. In response to the alternative score equaling or exceeding the threshold score (or equaling or exceeding an alternative threshold score), the online system 140 modifies the component 405 by replacing the content included in the component with the alternative content (i.e., the content generated by the generative model).

In some embodiments, in response to the alternative score being less than the threshold score, the online system 140 generates an additional prompt for the generative model including the alternative content and one or more instructions to modify the alternative content. In response to the additional prompt, the generative model generates modified alternative content for the component 405. The online system 140 may iteratively modify alternative content for inclusion in the component 405 until the alternative score for the component 405 including the alternative content equals or exceeds the threshold score in some embodiments. Further, the online system 140 may remove the component 405 rather than replace content from the physical document 400 comprising the component 405 with alternative content in response to the alternative score being less than the threshold score or in response to the alternative score being less than the threshold score after a threshold number of iterative modifications to the alternative content. In the example of FIG. 4, the online system 140 modifies component 405E by removing component 405E.

Based on the modifications to one or more components 405 of the physical document 400, the online system 140 generates an alternative document 435 including one or more components 405 of the physical document 400 that are not modified and including one or more components 405 of the physical document 400 that have been modified by the online system 140. In the example of FIG. 4, the alternative document 435 includes a replacement item 440 for component 405A in place of the item included in the physical document 400. Additionally, the alternative document 435 in FIG. 4 removes content from the physical document comprising component 405C and component 405E. However, the alternative document 435 of FIG. 4 maintains content from the physical document 400 comprising each of component 405B, component 405D, component 405F, component 405G, and component 405H. Hence, the online system 140 generates the alternative document 435 so content from the physical document 400 comprising at least one component 405 of the physical document 400 remains in the alternative document 435, while content for one or more other components 405 of the physical document 400 is modified to alternate so the other components 405 include different content in the alternative document 435 than in the physical document 400.

While FIG. 4 shows an example alternative document 435 where content from the physical document 400 in a component 405 has been modified to different content in the alternative document 435 and where certain components 405 of the physical document 400 have been removed from the alternative document 435, the alternative document 435 may additionally or alternatively include supplemental content the online system 140 adds to the content from the physical document 400. The supplemental content comprises content that is not included in the physical document 400. As further described above in conjunction with FIG. 3, supplemental content may comprise one or more additional items that augment items included in the physical document 400 or replacement items included in the alternative document 435 in place of one or more items included in the physical document 400.

To add supplemental content to the alternative document 435, the online system 140 identifies an injection point in the image of the physical document 400. A user, such as an administrative user associated with the source associated with the physical document 400 may provide the online system 140 with an input identifying the injection point in some embodiments. Alternatively, the online system 140 applies one or more models to the image of the physical document 400 that identify a location in the image for the injection point. In various embodiments, the injection point comprises one or more coordinates within the image of the physical document 400.

The online system 140 selects a set of additional items and selects one or more of the additional items for inclusion in the alternative document 435 at the injection point based on scores 425 for a component 405 when different additional items are included in the component 405. For example, the online system 140 selects a set of additional items from an item catalog of a source associated with the physical document 400 based on an item category including items proximate to the injection point on the physical document 400. As another example, the online system 140 selects additional items having embeddings with at least a threshold measure of similarity to embeddings of one or more items included in a component 405 nearest to the injection point in the physical document 400. The online system 140 applies the interaction model to attributes of the component 405 of the physical document when an additional item of the set is included, characteristics 410 of the user, attributes of the component 405 including the additional item, and characteristics 415 of the source, as further described above, to generate a supplemental score for each additional item. The online system 140 selects one or more additional items based on their supplemental scores. For example, the online system 140 selects additional items having at least a threshold supplemental score. As another example, the online system 140 ranks the additional items based on their supplemental scores and selects one or more additional items having at least a threshold position in the ranking. When selecting additional items based on the ranking, the online system 140 may select additional items having at least the threshold position in the ranking and having supplemental scores that equal or exceed the threshold supplemental score, so an additional item is not included unless the user has at least a threshold probability of performing the specific interaction with the component including the additional item corresponding to the threshold supplemental score.

In various embodiments, the online system 140 generates a prompt including characteristics of the component 405 to include the additional item and attributes of the additional item for the generative model. The prompt may also include one or more formatting instructions, as further described above. In response to the prompt, the generative model generates text or image content for the additional item, and online system 140 includes the generated text or image content for the additional item in the alternative document 435 at the injection point. In some embodiments, the online system 140 maintains a limit on a number of additional items to include in the alternative document 435 as supplemental content to limit a number of additional items presented via the alternative document 435 to optimize content for presentation by a display area of a user client device 110 presenting the alternative document 435. Other supplemental content, such as additional text or images, may be additionally or alternatively included in the alternative document 435 at one or more additional or alternative injection points in some embodiments.

Figure 5:
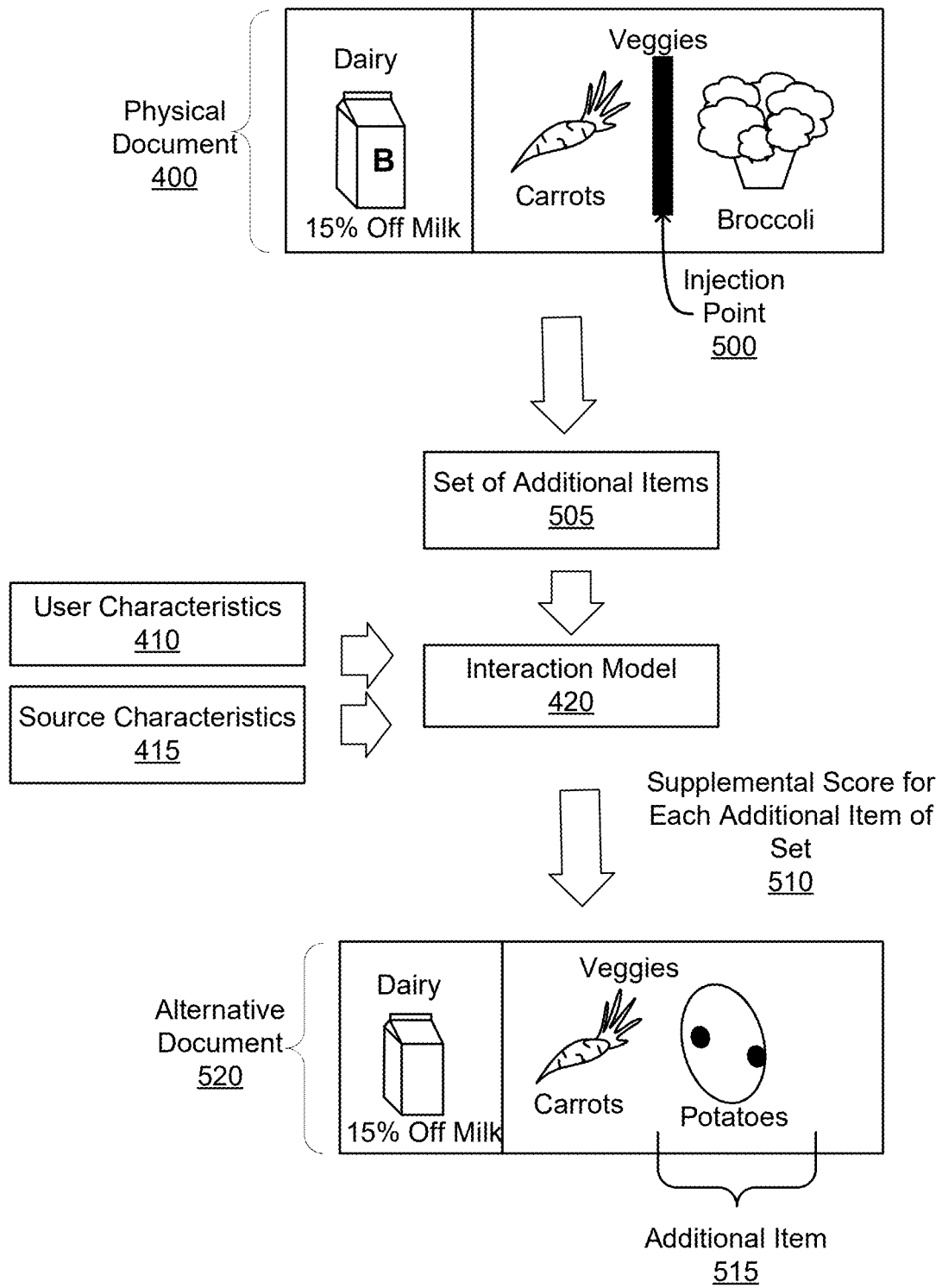
FIG. 5 illustrates a process flow diagram of augmenting content from a physical document with supplemental content in an alternative document generated for a user of an online system, in accordance with one or more embodiments.

FIG. 5 shows an example process flow diagram of generating an alternative document for a user of an online system 140 including supplemental content along with content from a physical document. In the example of FIG. 5, the online system 140 identifies an injection point 500 for supplemental content from an image of the physical document 400. As further described above in conjunction with FIG. 3, the online system 140 may apply one or more models to the image of the physical document 400 to identify the injection point 500 or the online system 140 receives coordinates of the injection point 500 in the image of the physical document 400 from an administrative user associated with the physical document 400.

In the example of FIG. 5, the online system 140 selects an additional item for inclusion at the injection point 500. The online system 140 selects a set 505 of additional items and applies the interaction model 420, further described above in conjunction with FIGS. 3 and 4 to each combination of an additional item of the set and the component 405 of the physical document 400 including the injection point 500 to generate a supplemental score 510 for each additional item. As further described above, the interaction model 420 generates a supplemental score 510 based on characteristics 410 of a user, attributes of the component 405 including an additional item of the set 505, attributes of the physical document, and characteristics 415 of the source. As further described above in conjunction with FIG. 3, in some embodiments, the online system 140 generates an adjusted supplemental score for each additional item to account for compensation the online system 140 receives from an entity associated with a supplemental item. For example, the online system 140 generates an adjusted supplemental score by converting the supplemental score for an additional item and an amount of compensation the online system 140 receives from an entity associated with the additional item in response to the user performing a specific interactions with the additional item into a common unit of measurement, with the adjusted supplemental score comprising a combination of the supplemental score and the amount of compensation in the common unit of measurement. In various embodiments, the online system 140 applies a conversion factor to the supplemental score or to the amount of compensation to convert the conversion factor and the supplemental score into the common unit of measurement.

Based on the supplemental scores (or based on the adjusted supplemental scores), the online system 140 selects an additional item 515 for inclusion in an alternative document 520. As further described above in conjunction with FIG. 3, the online system 140 selects the additional item 515 having a maximum supplemental score (or having a maximum adjusted supplemental scores) or selects the additional item 515 as an additional item having a supplemental score (or adjusted supplemental score) equaling or exceeding a threshold. In other embodiments, as further described above in conjunction with FIG. 3, the online system 140 ranks additional content items of the set 505 based on their supplemental scores (or based on their adjusted supplemental scores) and selects the additional content item 515 as an additional content item having at least a threshold position in the ranking.

In the example shown by FIG. 5, the alternative document 520 includes the additional item 515 selected by the online system 140 included at the injection point 500 identified in the physical document 400. Additionally, the digital content item modifies other content from the physical document 400 based on the characteristics 410 of the user, as further described above in conjunction with FIG. 4. Hence, the digital content item in the example of FIG. 5 includes one or more components of the physical document 400 that are not modified by the online system 140 and one or more components of the physical document 400 modified by the online system 140. Additionally, the online system 140 augments content from the physical document 400, or alternative content included in the alternative document 520 in place of content from the physical document 400, with an additional item 515 selected based in part on the characteristics 410 of the user to increase a likelihood of the user interacting with the alternative document 520.

Leveraging the characteristics 410 of the user and the attributes of different components 405 of the physical document 400 in the interaction model 420 allows the online system 140 to generate an alternative document 435 for presentation to the user including content more specifically tailored to the user than the physical document 400, while maintaining certain content from the physical document 400. Modifying one or more components 405 of the physical document 400 based on the characteristics 410 of the user includes alternative content in the alternative document 435 that increases a likelihood of the user performing the specific interaction with one or more components 405 relative to the physical document 400. Similarly, the online system 140 may remove one or more components 405 of the physical document 400 having less than a threshold score determined by the interaction model 420. Removing such components reduces content in the alternative document 435 with which the user is unlikely to interact, optimizing presentation of content via display area of a user client device 100 presenting the alternative document 435. Additionally, the online system 140 may augment content in the physical document 400 with supplemental content selected based on the characteristics 410 of the user and the physical document 400 when generating the alternative document 435 to increase an amount of content in the alternative document 435 with which the user is likely to perform the specific interaction.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
  receiving, at the computer system, an image of a physical document that includes one or more items available through a source;
  extracting, by the computer system, one or more components of the physical document from the image by applying of one or more trained computer vision models to the image of the physical document;
  selecting a user from a plurality of users;
  generating a score for each component of the physical document, wherein the score for a particular component of the physical document is generated by applying an interaction model to characteristics of the selected user, attributes of the component, attributes of the physical document, and characteristics of the source, and wherein the interaction model is a machine learning model that is trained by:
  obtaining a training dataset including a plurality of training examples, each training example including attributes of a training component of a training document, characteristics of a training user, attributes of the training document, and characteristics of a source associated with the training document, and each training example further having a label indicating whether the training user performed a specific interaction with the component of the training document;
  applying the interaction model to each training example of the training dataset to generate a predicted score for the training example indicating a probability of the training user performing the specific interaction with the component of the training document;
  scoring the interaction model using a loss function and the label of the training example; and
  updating one or more parameters of the interaction model by backpropagation based on the scoring until one or more criteria are satisfied;
identifying at least one component to be modified based on the generated scores;
modifying content included in the identified at least one component of the physical document; and
generating an alternative document that includes the modified content and one or more components of the physical document that are not modified.

2. The method of claim 1, wherein modifying content included in the identified at least one component of the physical document comprises:
  in response to the component comprising an item included in the physical document, selecting a set of candidate replacement items;
  generating a candidate score for each candidate replacement item of the set of candidate replacement items by applying the interaction model to characteristics of the user, attributes of the component including a candidate replacement item, attributes of the physical document, and characteristics of the source;
  selecting a replacement item based on the candidate scores for the set of candidate replacement items; and
  modifying the component to include the selected replacement item in place of the item.

3. The method of claim 2, wherein selecting the replacement item based on the candidate scores for the set of candidate replacement items comprises:
  ranking the candidate replacement items based on the candidate scores; and
  selecting the replacement item as a candidate replacement item having at least a threshold position in the ranking.

4. The method of claim 3, wherein ranking the candidate replacement items based on the candidate scores comprises:
  generating adjusted candidate scores for each candidate replacement item based on the candidate score for the candidate replacement item and compensation provided to the computer system from an entity associated with the candidate replacement item; and
  ranking the candidate replacement items based on their adjusted candidate scores.

5. The method of claim 1, wherein modifying content included in the identified at least one component of the physical document comprises:
  in response to the component comprising an item included in the physical document, selecting a set of candidate replacement items;
  generating a candidate score for each candidate replacement item of the set of candidate replacement items by applying the interaction model to characteristics of the user, attributes of the component including a candidate replacement item, attributes of the physical document, and characteristics of the source; and
  removing the component from the physical document in response to no candidate score exceeding a threshold candidate score.

6. The method of claim 1, wherein modifying content included in the identified at least one component of the physical document comprises:
  in response to the component comprising text or an image included in the component of the physical document, selecting a set of candidate replacement items, generating a prompt including the text or the image, an identifier of the component, formatting instructions, and an instruction to modify the text or the image;
  generating alternative content by applying a generative model to the prompt; and
  replacing the content included in the component with the alternative content.

7. The method of claim 1, wherein generating the alternative document that includes the modified content and one or more components of the physical document that are not modified comprises:
  identifying an injection point within the physical document from the image of the physical document;
  selecting supplemental content to include in the alternative document at the injection point;
  including the supplemental content in the modified alternative document at the injection point; and
  generating the alternative document including the supplemental content at the injection point.

8. The method of claim 7, wherein selecting supplemental content to include in the alternative document at the injection point comprises:
  selecting a set of additional items;
  generating a supplemental score for each additional item by applying the interaction model to characteristics of the user, attributes of the component including an additional item, attributes of the physical document, and characteristics of the source; and
  selecting one or more additional items based on the supplemental scores for the set of additional items.

9. The method of claim 7, wherein generating the alternative document that includes the modified content and one or more components of the physical document that are not modified comprises:
  generating a prompt including attributes of a component including the injection point, attributes of a selected additional item, one or more formatting instructions, and an instruction to generate content for the selected additional item;
  applying a generative model to the prompt; and
  including content generated by the generative model in response to the prompt at the injection point.

10. The method of claim 1, wherein modifying content included in the identified at least one component of the physical document comprises:
  generating a plurality of candidate documents, each candidate document including different alternative content included in the component of the physical document;
  for each candidate document, generating a candidate score by applying the interaction model to characteristics of the user, attributes of the component, attributes of the candidate document, and characteristics of the source; and selecting a candidate document based on the candidate scores.

11. The method of claim 1, wherein generating the alternative document that includes the modified content and one or more components of the physical document that are not modified comprises:

applying one or more rules to the components of the physical document, a rule identifying a type of component and identifying content for inclusion in components having the type; and replacing content from the physical document comprising a component having the type with content identified by the rule.

12. A computer program product comprising a non-transitory computer readable storage medium having instructions encoded thereon that, when executed by a processor, cause the processor to perform steps comprising:

receiving, at a computer system, an image of a physical document that includes one or more items available through a source;

extracting, by the computer system, one or more components of the physical document from the image by applying of one or more trained computer vision models to the image of the physical document;

selecting a user from a plurality of users;

generating a score for each component of the physical document, wherein the score for a particular component of the physical document is generated by applying an interaction model to characteristics of the selected user, attributes of the component, attributes of the physical document, and characteristics of the source, and wherein the interaction model is a machine learning model that is trained by:

obtaining a training dataset including a plurality of training examples, each training example including attributes of a training component of a training document, characteristics of a training user, attributes of the training document, and characteristics of a source associated with the training document, and each training example further having a label indicating whether the training user performed a specific interaction with the component of the training document;

applying the interaction model to each training example of the training dataset to generate a predicted score for the training example indicating a probability of the training user performing the specific interaction with the component of the training document;

scoring the interaction model using a loss function and the label of the training example; and updating one or more parameters of the interaction model by backpropagation based on the scoring until one or more criteria are satisfied;

identifying at least one component to be modified based on the generated scores;

modifying content included in the identified at least one component of the physical document; and generating an alternative document that includes the modified content and one or more components of the physical document that are not modified.

13. The computer program product of claim 12, wherein modifying content included in the identified at least one component of the physical document comprises:

in response to the component comprising an item included in the physical document, selecting a set of candidate replacement items;

generating a candidate score for each candidate replacement item of the set of candidate replacement items by applying the interaction model to characteristics of the user, attributes of the component including a candidate replacement item, attributes of the physical document, and characteristics of the source;

selecting a replacement item based on the candidate scores for the set of candidate replacement items; and modifying the component to include the selected replacement item in place of the item.

14. The computer program product of claim 13, wherein selecting the replacement item based on the candidate scores for the set of candidate replacement items comprises:

ranking the candidate replacement items based on the candidate scores; and selecting the replacement item as a candidate replacement item having at least a threshold position in the ranking.

15. The computer program product of claim 12, wherein modifying content included in the identified at least one component of the physical document comprises:

in response to the component comprising an item included in the physical document, selecting a set of candidate replacement items;

generating a candidate score for each candidate replacement item of the set of candidate replacement items by applying the interaction model to characteristics of the user, attributes of the component including a candidate replacement item, attributes of the physical document, and characteristics of the source; and removing the component from the physical document in response to no candidate score exceeding a threshold candidate score.

16. The computer program product of claim 12, wherein modifying content included in the identified at least one component of the physical document comprises:

in response to the component comprising text or an image included in the component of the physical document, selecting a set of candidate replacement items, generating a prompt including the text or the image, an identifier of the component, formatting instructions, and an instruction to modify the text or the image;

generating alternative content by applying a generative model to the prompt; and replacing the content included in the component with the alternative content.

17. The computer program product of claim 12, wherein generating the alternative document that includes the modified content and one or more components of the physical document that are not modified comprises:

identifying an injection point within the physical document from the image of the physical document;

selecting supplemental content to include in the alternative document at the injection point;

including the supplemental content in the modified alternative document at the injection point; and generating the alternative document including the supplemental content at the injection point.

18. The computer program product of claim 17, wherein selecting supplemental content to include in the alternative document at the injection point comprises:

selecting a set of additional items;

generating a supplemental score for each additional item by applying the interaction model to characteristics of the user, attributes of the component including an additional item, attributes of the physical document, and characteristics of the source; and selecting one or more additional items based on the supplemental scores for the set of additional items.

19. The computer program product of claim 12, wherein generating the alternative document that includes the modified content and one or more components of the physical document that are not modified comprises:

applying one or more rules to the components of the physical document, a rule identifying a type of component and identifying content for inclusion in components having the type; and replacing content from the physical document comprising a component having the type with content identified by the rule.

20. A computer system comprising:

a processor; and a non-transitory computer readable storage medium having instructions encoded thereon that, when executed by the processor, cause the processor to perform steps comprising:

receiving, at the computer system, an image of a physical document that includes one or more items available through a source;

extracting, by the computer system, one or more components of the physical document from the image by applying of one or more trained computer vision models to the image of the physical document;

selecting a user from a plurality of users;

generating a score for each component of the physical document, wherein the score for a particular component of the physical document is generated by applying an interaction model to characteristics of the selected user, attributes of the component, attributes of the physical document, and characteristics of the source, and wherein the interaction model is a machine learning model that is trained by:

obtaining a training dataset including a plurality of training examples, each training example including attributes of a training component of a training document, characteristics of a training user, attributes of the training document, and characteristics of a source associated with the training document, and each training example further having a label indicating whether the training user performed a specific interaction with the component of the training document;

applying the interaction model to each training example of the training dataset to generate a predicted score for the training example indicating a probability of the training user performing the specific interaction with the component of the training document;

scoring the interaction model using a loss function and the label of the training example; and updating one or more parameters of the interaction model by backpropagation based on the scoring until one or more criteria are satisfied;

identifying at least one component to be modified based on the generated scores;

modifying content included in the identified at least one component of the physical document; and generating an alternative document that includes the modified content and one or more components of the physical document that are not modified.

* * * * *